(12) United States Patent
Khanna et al.

(10) Patent No.: US 9,032,085 B1
(45) Date of Patent: *May 12, 2015

(54) IDENTIFYING USE OF SOFTWARE APPLICATIONS

(71) Applicant: Amazon Technologies, Inc., Reno, NV (US)

(72) Inventors: Richendra Khanna, Seattle, WA (US); Weijiang Yu, Seattle, WA (US); Rajiv Chopra, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/092,221

(22) Filed: Nov. 27, 2013

Related U.S. Application Data

(63) Continuation of application No. 13/620,814, filed on Sep. 15, 2012, now Pat. No. 8,626,935, which is a continuation of application No. 11/613,007, filed on Dec. 19, 2006, now Pat. No. 8,307,099.

(60) Provisional application No. 60/865,618, filed on Nov. 13, 2006.

(51) Int. Cl.
  *G06F 15/16* (2006.01)
  *H04L 29/06* (2006.01)
(52) U.S. Cl.
  CPC .................................. *H04L 63/1483* (2013.01)
(58) Field of Classification Search
  USPC ........................................................ 709/229
  See application file for complete search history.

(56) References Cited

U.S. PATENT DOCUMENTS

| | | | |
|---|---|---|---|
| 6,247,048 B1 | 6/2001 | Greer et al. | |
| 7,287,159 B2 | 10/2007 | Rabin et al. | |
| 7,318,092 B2 | 1/2008 | Sutler | |
| 7,330,871 B2 | 2/2008 | Barber | |
| 2002/0035622 A1 | 3/2002 | Barber | |
| 2002/0186237 A1 | 12/2002 | Bradley et al. | |
| 2003/0046391 A1 | 3/2003 | Moreh et al. | |
| 2005/0080870 A1 | 4/2005 | Marks et al. | |
| 2005/0144236 A1 | 6/2005 | Ying et al. | |
| 2005/0228989 A1 | 10/2005 | Rabin et al. | |
| 2005/0268107 A1* | 12/2005 | Harris et al. | 713/182 |
| 2006/0064598 A1 | 3/2006 | Higashikado et al. | |
| 2006/0169777 A1 | 8/2006 | Colson et al. | |
| 2007/0036470 A1* | 2/2007 | Piersol et al. | 382/306 |

(Continued)

*Primary Examiner* — Hamza Algibhah
(74) *Attorney, Agent, or Firm* — Seed IP Law Group PLLC

(57) ABSTRACT

Techniques are described for identifying the use of software applications, such as to determine an identity of a user interacting with a Web site or other electronic information service based on information regarding an application copy used by the user. When a communication is received from a software application, the communication is analyzed to attempt to identify a particular software application copy that sent the communication. Various types of information about a client software application copy may be used in the analysis, including information about particular configuration settings for the client software application and for the client computing device on which the client software application is executing. After a matching software application copy is identified for a received communication, possible inappropriate activities related to the received communication may be identified in various ways, including based on previous communications received from the same software application copy.

20 Claims, 4 Drawing Sheets

(56) References Cited

U.S. PATENT DOCUMENTS

| | | |
|---|---|---|
| 2007/0185986 A1 | 8/2007 | Griffin et al. |
| 2007/0239606 A1 | 10/2007 | Eisen |
| 2007/0255818 A1 | 11/2007 | Tanzer et al. |
| 2007/0255821 A1 | 11/2007 | Ge et al. |
| 2008/0086409 A1 | 4/2008 | Moorman et al. |
| 2008/0104199 A1 | 5/2008 | Kalaboukis |
| 2008/0201464 A1 | 8/2008 | Campbell et al. |

\* cited by examiner

IDENTIFYING USE OF SOFTWARE APPLICATIONS

CROSS REFERENCE TO RELATED APPLICATIONS

This application is a continuation of co-pending U.S. patent application Ser. No. 13/620,814, filed Sep. 15, 2012 and entitled "Identifying Use of Software Applications," which is a continuation in part of U.S. patent application Ser. No. 11/613,007, now issued as U.S. Pat. No. 8,307,099, filed Dec. 19, 2006 and entitled Identifying Use of Software Applications, both of which are hereby incorporated herein by reference in their entireties. U.S. application Ser. No. 11/613,007 claims the benefit of provisional U.S. Patent Application No. 60/865,618, filed Nov. 13, 2006 and entitled "Identifying Use of Software Applications," which is hereby incorporated by reference in its entirety.

TECHNICAL FIELD

The following disclosure relates generally to techniques for identifying use of software applications, such as to identify users interacting with a Web site based on their use of Web browser applications.

BACKGROUND

In addition to providing access to information, the World Wide Web (or "Web") has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with a merchant, retailer or electronic marketplace that provides one or more items, such as to view information about the items, give an instruction to place an order for one or more items, and provide information needed to complete the purchase (e.g., payment and shipping information). After receiving an order for one or more items, a Web merchant then fulfills the order by providing the ordered items to the indicated recipient. The items may be products that are delivered electronically to a recipient (e.g., music downloaded over the Internet) or through physical distribution channels (e.g., paperback books shipped via a governmental postal service or private common carrier). The items may also be services that are provided either electronically (e.g., providing email service) or physically (e.g., performing cleaning services at the house of the purchaser). The order fulfillment process typically used by Web merchants for product items that are to be physically provided shares similarities with other item ordering services that ship ordered items (e.g., catalog-based shopping, such as from mail-order companies), such as to deliver ordered items from one or more physical distribution or fulfillment centers operated by or on behalf of the Web merchant.

While some services available via the Web or otherwise via the Internet or other access mechanisms may provide information and capabilities to anyone, many others have at least some information that is restricted to authorized users, such as to protect the privacy of confidential information related to users by making it available only to those users (e.g., to require a user to login to an email service before making the user's email available, to require a bank customer to login before making financial information available, etc.). Many such services may further store various user data to assist functionality that is provided by the service (e.g., for a Web merchant to store shipping information for a user and information about financial instruments for a user to facilitate the user's shopping, such as in a manner associated with an account maintained for the user).

Since unauthorized access to such restricted information about users may provide various benefits to unscrupulous parties, such parties attempt to devise ways to gain access to the restricted information of the Internet services. For example, one popular technique, known as phishing, involves fooling unsuspecting victims into supplying login information and/or other personal information via a fraudulent Web site that masquerades as a legitimate Web site. In order to masquerade as the legitimate site, the party performing the phishing (referred to as a "phisher") may download various electronic information from the legitimate site (e.g., images, client-side scripts, CSS ("Cascading Style Sheets") files, etc.) to use in creating the fraudulent site. After creating the fraudulent site, the phisher will often send an email or other electronic communication disguised as being from the legitimate site, which prompts the intended victims to update and/or supply personal information in a way that directs the victims to the fraudulent site. Depending on the type of fraudulent site, some users may then be tricked into directly supplying confidential information to the fraudulent site, or instead may be tricked into supplying login information for the legitimate site to the fraudulent site that the phisher can then use to obtain confidential information for those users from the legitimate site by acting as those users. The confidential information obtained by the phisher may then be used to commit fraud in various ways. Unscrupulous parties may further use various other techniques to fraudulently obtain confidential information about users, including a technique known as "pharming" that involves redirecting a user from a legitimate site to a fraudulent one masquerading as the legitimate one in other ways.

Fraudulent activity, such as pharming and phishing, creates significant problems for both users of the Internet services and the Internet services themselves. For example, a bank or a merchant may lose money when fraudulent transfers or charges are made. In addition, fraudulent activity may generate a significant number of calls (or other contacts) with customer service for the Internet services. Furthermore, even if an Internet service was not responsible for the loss of users' confidential information, users may nonetheless lose trust in the Internet service based on the fraudulent activity and be reluctant to continue interacting with the Internet service. For the users, identity theft may be perpetrated using the confidential information of the users, thus creating significant difficulties for the users.

Thus, it would be beneficial for a variety of reasons to accurately identify users who interact with a Web site or other electronic information service, including to inhibit unscrupulous users from attempting to mask their true identities, as well as to provide additional benefits.

DETAILED DESCRIPTION

Figure 1:
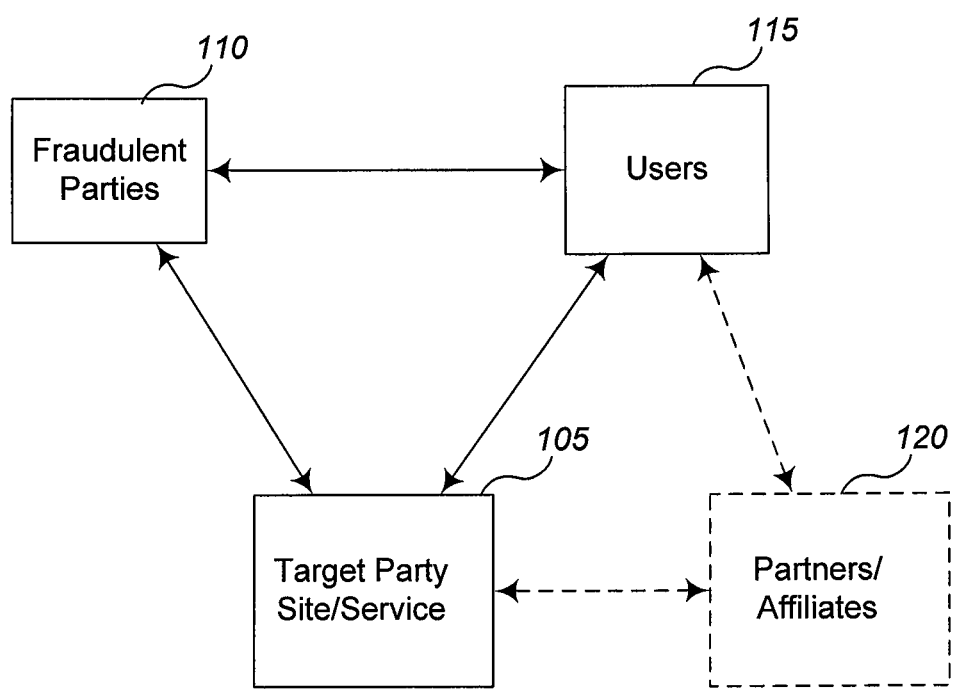
FIG. 1 illustrates example interactions involving users of Internet services.

Techniques are described for identifying the use of particular copies of software applications, such as when a request or other communication is received by a Web site or other electronic information service from a software application copy on behalf of a user. Information about a particular identified software application copy may be used in various ways in various embodiments, including to assist in determining whether communications from that particular software application copy are likely to reflect inappropriate activities, as well as to in some embodiments determine an identity of a user who initiated a communication using that software application copy. In at least some embodiments, the identification of a particular client software application copy includes analyzing one or more of various types of information related to that client software application copy, as discussed in greater detail below, including information about particular configuration settings for the client software application copy and/or for the client computing device on which the client software application is executing. As discussed in greater detail below, the analysis may be performed for various types of client software applications (e.g., Web browser applications) executing on client computing devices, and a combination of various types of information about a client software application copy may be used in the analysis. In at least some embodiments, the described techniques are performed by an automated Application Usage Identification system operating in conjunction with one or more Web sites or other electronic information services.

The described application information analysis techniques may be used in various manners in various embodiments. For example, in some embodiments the techniques are used in various ways to inhibit activities of users who attempt to perform inappropriate activities when interacting with a Web site or other electronic information service. Such inappropriate users and activities may include, for example, fraudulent users who create new user accounts and/or attempt to gain unauthorized access to other users' accounts in order to perform fraudulent transactions (e.g., to purchase items from merchants without providing valid payment), fraudulent users who attempt to impersonate other users (e.g., to gain access to confidential information of the other users), users who violate conditions or other standards of appropriate behavior (e.g., by using offensive language in postings, by sending spam or other unauthorized communications), etc. In particular, in at least some embodiments, an Application Usage Identification system analyzes information that is received along with a communication from a client software application copy in order to identify a combination of configuration and other information about the application copy that may be used to uniquely identify that copy of the client software application, or instead in some embodiments and situations to identify a limited number of possible copies of the client software application that each match the identified combination of information (also referred to as a "fingerprint" for the one or more matching client software application copies). After one or a limited number of matching application copies are identified for a received communication, previously gathered information about the identified application copy or copies may be used to determine whether the current received communication is a suspect communication that is likely to represent inappropriate activities by the user who initiated the received communication.

If a particular client software application copy is identified for a received request or other communication, a particular user of the identified application copy may in some embodiments be automatically identified (e.g., based on prior use of the identified application copy by the user), and information about the user identity may be used to inhibit inappropriate activities. For example, if the identified user is known or suspected of prior inappropriate activities, such as fraudulent activities, the current received request or other communication may be identified as a suspect communication, and as a result may be denied or diverted for special handling (e.g., manual review, additional automated analysis and/or tracking, etc.). Alternatively, if the communication indicates that it is being performed on behalf of a particular user who differs from the automatically identified user for the application copy, the communication may similarly be identified as a suspect communication that is denied or diverted for special handling (e.g., based on the current communication potentially representing unauthorized use of the application copy by the indicated user). In addition, if the communication indicates that it is being performed on behalf of a particular user but the identified application copy for the communication does not match the one or more application copies previously used by the indicated user, the communication may similarly be identified as a suspect communication that is denied or diverted for special handling (e.g., based on the current communication potentially representing a fraudulent user attempting to impersonate the indicated user).

Even if a particular user identity is not known for an identified software application copy, the application copy identification may nonetheless be used in some embodiments and situations to inhibit inappropriate activities. For example, if the identified application copy has previously been used one or more times for inappropriate activities, the current received communication may be identified as a suspect communication that is denied or diverted for special handling even if the identity of the corresponding user is not known. Thus, even if a particular fraudulent user attempts to hide his/her identity and involvement in prior inappropriate activities (e.g., by changing user accounts, removing Web cookies and other indications of previous interactions, etc.), but continues to use the same application copy, current attempts to perform inappropriate activities may be inhibited.

Even if multiple possible matching application copies are identified for a received communication, that information may still be used in some embodiments to inhibit inappropriate user activities. For example, in some embodiments special communication handling capabilities (e.g., manual review, additional automated analysis and/or tracking, etc.) may be available for use with some, but not all, received communications, such as due to a large volume of received communications. In such situations, by identifying a limited number of multiple possible matching application copies for a received communication, the number of received communications that are considered for the special handling may be greatly reduced. For example, if none of the multiple possible matching application copies for a received communication are associated with known or suspected inappropriate users or with application copies that were previously used for inappropriate activities, the received communication may not be identified as a suspect communication, and accordingly be automatically excluded from additional special handling. Alternatively, if one or more of the multiple possible matching application copies for a received communication is associated with known or suspected inappropriate users or with application copies that were previously used for inappropriate activities, the received communication may be selected to be or at least considered to possibly be a suspect communication to receive special handling, such as to monitor, further assess, or place limits on the activities allowed for the received communication due to the increased likelihood that the received communication could be associated with an inappropriate user or previously known inappropriate application copy. In addition, in some embodiments, if a received communication is identified as a suspect communication and is denied or subjected to additional specialized handling that delays or prevents a user from obtaining desired information and/or functionality, the Application Usage Identification system and/or a related system may further provide a mechanism for a user who asserts that he/she was inappropriately identified as being engaged in potentially inappropriate activities to appeal the prior decision or otherwise request that a request of the received communication be fulfilled.

As previously noted, in at least some embodiments and situations, the Application Usage Identification system analyzes information that is received from a client software application copy in order to identify a "fingerprint" of configuration and/or other information about the application copy that may be used to uniquely identify one or more possible matching copies of the client software application. A variety of types of parameters may be used as part of the fingerprint information in various embodiments and situations. For example, if the client software application is a Web browser, such as being used to send requests or other communications to a Web site, the received messages and communications from the Web browser application typically include an HTTP ("HyperText Transfer Protocol") header with various fields that represent configuration information for the Web browser and other types of related information. In such embodiments, the values supplied for one or more of the HTTP header fields may be used as at least some of the parameters for the fingerprint information. For example, in some embodiments, the fingerprint may include a combination of values supplied in each of the following HTTP header fields: the HTTP User-Agent request field that indicates information about the user agent originating the communication (e.g., CERN-LineMode/2.15, libwww/2.17b3, etc.); the HTTP Accept-Charset request field that indicates what character sets are acceptable for a response (e.g., iso-8859-5, unicode-1-1, etc.); the HTTP Accept-Encoding request field that restricts the content-codings that are acceptable in the response (e.g., compress, gzip, etc.); and the HTTP Accept-Language request field that restricts the set of natural languages that are preferred as a response to the request (e.g., da, en-gb, etc.). In other embodiments, one or more other HTTP header fields may be used as parameters, whether in addition to or instead of some or all of the previously noted HTTP header fields, such as any other fields that include information that will typically not change for each communication and/or for at least a minimum period of time. Other types of client software applications may have similar header fields or other mechanisms for passing values of configuration parameters and related parameters, and such fields or other mechanisms may similarly be used to obtain the fingerprint combination information. In addition, in some embodiments Web browser cookies may be used as part of the fingerprint information, although in other embodiments cookies may not be used due to their susceptibility of deletion by users attempting to hide their identity.

In at least some embodiments and situations, the Application Usage Identification system uses additional information for the fingerprint, whether instead of or in addition to HTTP header field values and/or other information sent as part of the received communication being analyzed. In at least some embodiments, the additional information is supplied by a client-side executable that is executing on the client device on which the client software application copy is executing. Such a client-side executable may have various forms, such as a Web browser applet, executable code using JavaScript or Flash or other formats to be executed within a Web browser (e.g., with the executable code being supplied to the client device via a Web page or other information that is previously sent to the client device), an application specially designed to perform the communications being analyzed in such a manner as to include the additional information, etc. The types of additional information to be used as fingerprint parameters may have various forms in various embodiments, and in some embodiments may include a combination of the time zone of the client device, the screen resolution of the client device, and the different installed plug-ins and their versions for the client application copy or client device. In other embodiments, the additional information may include a variety of other types of information about the client device, such as information about an operating system in use, a CPU version, a serial number or other hardware identification information, information about peripherals that are installed and in use, etc.

Thus, various individual parameter values and/or combinations of parameter values may be used in various embodiments to establish a fingerprint for one or more matching client application copies. In addition, the parameter values that are used may vary in various situations, such as if only some received communications are analyzed (e.g., communications of a particular type, communications received at certain times, etc.), and/or if different parameter values are used in different situations (e.g., for different types of communications, for different types of client applications, etc.). Furthermore, the particular parameter values to be used may be determined in various manners in various embodiments, such as based on a predefined manual selection, by automated analysis of prior requests to identify parameter types that are effective in identifying individual client application copies or limited numbers of multiple possible matching client application copies, etc.

In some embodiments, after the one or more parameters values to be used for a fingerprint of a received communication are obtained, the one or more parameter values are combined and/or processed in various ways to create a resulting fingerprint identifier, such as to allow efficient storage of the fingerprint identifier and/or efficient matching of a newly created fingerprint identifier to previously stored fingerprint identifiers (e.g., fingerprint identifiers of client application copies previously used for inappropriate activities, fingerprint identifiers of client application copies previously used by known identified users, fingerprint identifiers for all previously received and analyzed communications within a prior period, etc.). As one example, in some embodiments the fingerprint identifiers are created using the MD5 (Message-Digest algorithm 5) cryptographic hash function, so as to perform a one-way hash in which the original parameters values that are used to create a hashed fingerprint identifier are not identifiable or recoverable from the hashed fingerprint identifier. In addition to allowing for efficient matching, the use of such a one-way hash allows the privacy and security of information about client application copies and client devices to be protected, such as if the parameter values and any other information that is used to create a hashed fingerprint identifier is discarded after the hashed fingerprint identifier is created. In other embodiments, the fingerprint identifier for one or more parameter values may be created in other manners, including by merely storing the one or more parameter values in an associated manner (e.g., as a concatenated string, as an array of values, etc.).

As previously noted, in some embodiments the described application information analysis techniques may be used to inhibit activities of users who attempt to perform inappropriate activities when interacting with a Web site or other electronic information service, such as users attempting to perform various types of fraudulent activities. For illustrative purposes, some embodiments are described below in which the described techniques are used in particular ways to inhibit particular types of fraudulent activity, and in which particular types of fingerprint information are used to identify particular types of client software application copies in particular types of ways. However, it will be appreciated that the described techniques may be used in a wide variety of other situations, and thus the invention is not limited to the exemplary details provided.

In some embodiments, the described techniques involve automatically analyzing at least some communications that are requests for information received by a Web site or other electronic information service, such as to assist in determining whether the received requests are suspect communications that are likely to reflect fraudulent activities by the senders of the requests or by other third-parties that initiate the requests. For example, repeated communications of the same or a similar type may be suspect communications that reflect attempted fraudulent activities, such as of a phisher user or a user attempting to perform fraudulent transactions. In addition, the analysis activities may be performed for only selected received communications, such as for information requests related to confidential user information (e.g., account information of a user) or communications related to performing login activities. Alternatively, some received communications may be filtered before the automated analysis is performed so as to exclude some communications from analysis. Such filtering may be based on various factors in various embodiments, such as at least in part on one or more of the following: the information requested (e.g., the type of information, such as information that is publicly accessible or that is not currently available); a third-party information source with which the user was interacting to initiate the request (such as may be indicated by an HTTP referer field used with the request, including in the form of an absolute URL or a relative URL), such as a third-party information source that is authorized to make the request or that was previously determined to be engaged in legitimate activities; the type of client-side application (or "user-agent") making the request, such as if the user-agent is a known search engine crawler robot, or is a particular type of Web browser that enforces enhanced security standards; the IP address of the sender of the request; and other information included with the request (e.g., cookies, an operating system of the requestor, such as to detect if the operating system is a sever operating system, etc.).

If fraudulent activity is suspected with respect to one or more received communications identified as suspect communications, one or more special handling actions may be taken to inhibit the fraudulent activity. For example, for one or more suspect communications associated with one or more users, the activities may include automatically freezing accounts of the users and/or notifying the users (e.g., based on a third-party having potentially gained access to confidential information about the user, or to login or other access information that will allow the suspect third-party to access such confidential information in the near future). In addition, activities related to a suspect third-party information source and/or a suspect request sender may include taking activities to shut down that third-party information source or sender or to otherwise prevent that third-party information source or sender from continuing to engage in fraudulent activities. In some embodiments, the actions may also include providing information about the suspect third-party information sources or suspect senders to one or more humans for manual review, such as for each communication associated with the suspect parties, or by aggregating information about multiple related suspect communications and/or other related information about a suspect party before it is provided for manual review. Furthermore, in some embodiments, some or all of the communications may be analyzed in real-time (e.g., as the requests are received), while in other embodiments some or all of the communications are analyzed at a later time (e.g., based on information retrieved from log files that store information about some or all received communications). If performed at a later time, the communications may still be analyzed soon after receipt (e.g., within a few hours), such as to allow rapid detection and prevention of fraudulent activities.

FIG. 1 illustrates various types of interactions that may occur between users and electronic sites or information services, such as Web sites and other services available via the Internet or other communications networks (e.g., private cellular or landline telephone networks). In this example, a target party site or service 105 offers one or more services (e.g., a Web store, online banking, payment processing, Web-based email, Web services, etc.) or other electronically accessible information to users 115, and may store confidential information (not shown) regarding the users that is available only to those users (e.g., via user accounts maintained by the target party site/service). The users 115 use client software applications (e.g., Web browsers, not shown) executing on client devices (not shown) to access the services or information from the target party site/service. In order for a user to obtain such access, the user makes one or more information requests to the target party site/service (e.g., requests based on the HTTP protocol from a Web browser of the user) for particular electronically accessible resources or other information available from the target party site/service (e.g., user account information, images, login pages, etc.). In some situations, the target party may also have one or more other business entities that are partners and/or affiliates 120 (e.g., based on contractual agreements), and the users may also optionally interact with the partners/affiliates to receive additional information and/or functionality. Partners and/or affiliates 120 may also interact with the target party 105 in various ways, including by making various types of authorized information requests to the target party (e.g., to retrieve various information from the target party for display or other use, such as product images to display, or address information for links to the target party site/service to be provided for selection and use by users). Similarly, the target party 105 may interact with the partners and/or affiliates in various ways.

In this example, one or more third-party fraudulent parties 110 (e.g., phishers, pharmers, identity theft perpetrators, etc.) may also be present and may attempt to obtain information about users of the target party site/service in various ways. For example, a fraudulent party may initially directly interact with the target party site/service 105 to retrieve information about the target party for use in furthering its fraudulent activities (e.g., to obtain information about Web pages or other information provided by the target party in order to enable the fraudulent party to masquerade as the target party, such as by creating a fraudulent Web site to replicate or mimic at least portions of a Web site provided by the target party). The initial interactions by the fraudulent party may include, for example, examining the design of various Web pages, examining the structure of the URLs ("Uniform Resource Locator") of various information resources available from the target party, retrieving images and other information from the target party, etc. After a fraudulent party obtains sufficient information about the target party, the fraudulent party may create one or more fraudulent sites or services (not shown)

masquerading as the target party site/service 105, such as by using one or more Web development kits that can assist in such masquerading.

After creating a fraudulent third-party information source (e.g., a fraudulent site or service) intended to fraudulently obtain confidential information about users, the fraudulent party may then induce at least some of the users 115 to interact with the fraudulent third-party information source, such as by sending an electronic communication (e.g., email, instant message, automated telephone call, etc.) to one or more users with a link or other reference to the fraudulent third-party information source. The electronic communication may, for example, direct a user to click on or otherwise select a provided link to allegedly perform one or more activities with respect to the target party (e.g., update personal information, change passwords, etc.). When a user selects the link, the fraudulent site/service may then send information (e.g., a Web page) to the user that contains a form or other user interface to prompt the user to provide login information (e.g., username and password) or other personal information (e.g., financial information, contact information, medical information, etc.), such as in a manner that is intended to deceive the user into believing that the user is interacting with the target party site/service (e.g., by mimicking a visual appearance and/or functionality of the target party site/service). If the user directly supplies personal information, the fraudulent party 110 may then use that information for various fraudulent activities, such as to use obtained financial information for the user to purchase merchandise or open credit accounts, or to otherwise perform activities related to identity theft. If the user supplies login information, the fraudulent party 110 may then interact with the target party site/service by masquerading as the user (e.g., to access confidential information about the user for later use, or to perform various operations with the target party, such as buying merchandise or transferring money), as then may similarly further perform various additional fraudulent activities at other sites and/or offline.

The Web page or other information sent from the fraudulent site to a user may also include links to various content at the target party. For example, the provided information may not include all information for use by a Web browser of the user in rendering a Web page being provided by the fraudulent site, such as by including links or references to resources or information from the target site (e.g., images, JavaScript, CSS files, etc.) that are for automatic client-side retrieval by the Web browser. If so, the Web browser will automatically use such links/references to request those resources/information from the target party 105 on behalf of the user as part of presenting the provided information from the fraudulent site to the user. Furthermore, a fraudulent party may desire that the user not realize that the fraudulent site is not the target party site/service (e.g., so that the user does not take immediate action to prevent access to and/or use of any confidential information of the user), but may be unable or willing to fully reproduce all aspects of the target party site/service. Instead, the fraudulent party may desire to, after the desired information about the user is obtained, cause the user to commence further interactions with the target party site/service in a seamless manner. If the fraudulent party is successful, the user may never realize that the user temporarily interacted with a party other than the target party. Thus, the Web page or other information sent from the fraudulent site to a user may further include user-selectable links to particular information resources located at the target party site/service, such as, for example, links to privacy policies, help pages, current promotions, user account information, etc. Once a user selects one of these links, the fraudulent site may thus cause the user's Web browser to initiate a request to the target party for a new group of information (e.g., a new Web page to display), after which ongoing interactions by the user will be directly with the target party site/service (based on selections of additional links or other controls provided in the new group of information).

While not illustrated in this example, in some embodiments an automated Application Usage Identification system (not shown) may further be present in order to use the described techniques to detect some or all of the fraudulent activities by the fraudulent parties, and to inhibit those and related future fraudulent activities. Such a system may be, for example, executing on a target party's computing system(s) to analyze information requests received by the target party site/service, or may instead execute on one or more remote computing systems (not shown) to provide software application copy identification services to multiple unaffiliated target parties, such as for a fee. Various embodiments of the Application Usage Identification system may analyze, for example, the information requests from users that are initiated by the fraudulent third-party information sources to direct the user to perform subsequent interactions with a target party, the information requests made by Web browsers on behalf of users to automatically retrieve target party information to be displayed along with other information from a fraudulent third-party information source, the initial requests by fraudulent parties to obtain information about the target party for later use in fraudulently interacting with users, the subsequent requests by fraudulent parties that use fraudulently obtained user information (e.g., login information) to access confidential information about the users from the target party, the subsequent requests by fraudulent parties that use fraudulently obtained user information (e.g., credit card information) to attempt to perform fraudulent transactions with the target party, etc. Additional details regarding activities of embodiments of the Application Usage Identification system are included below.

Figure 2:
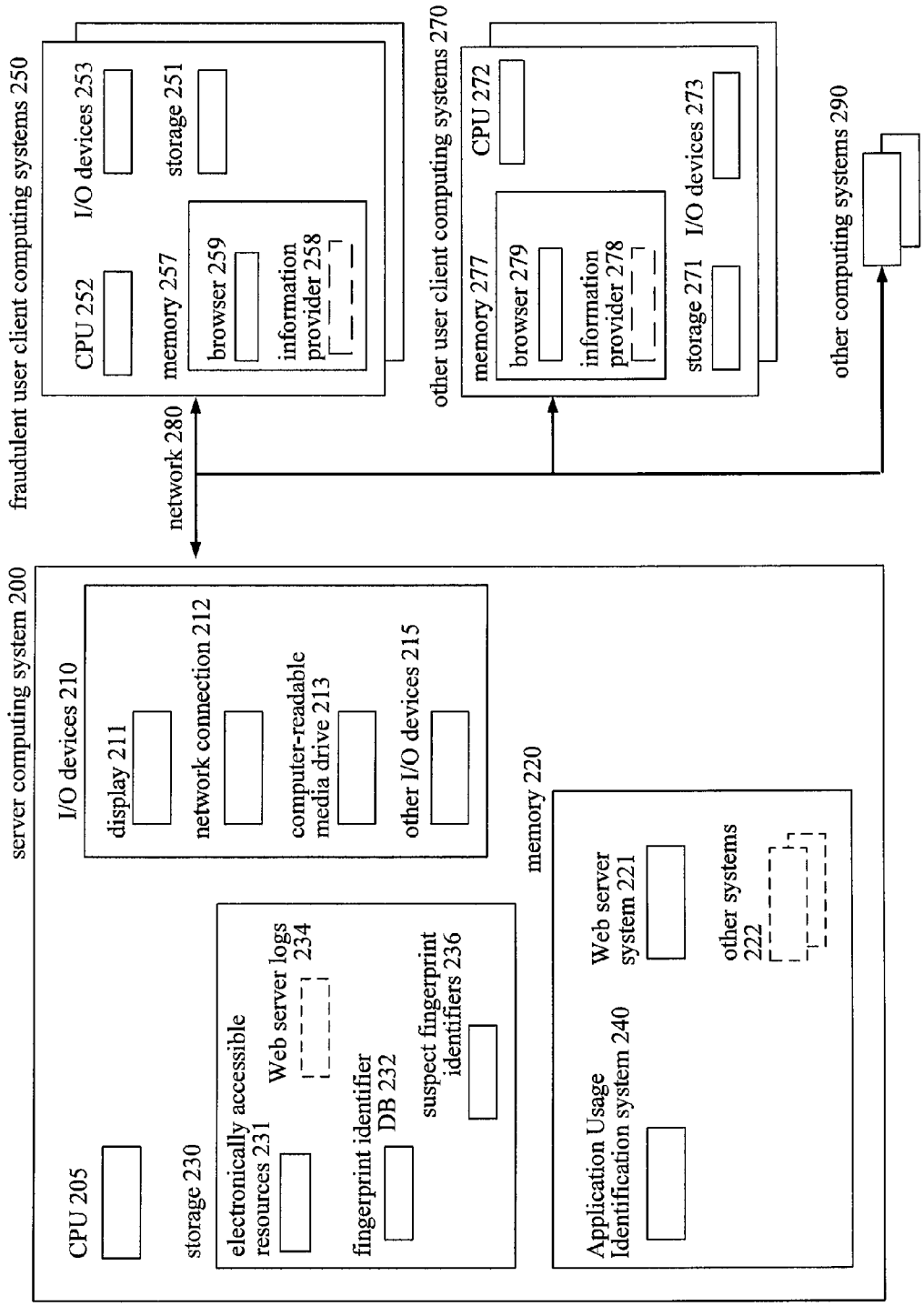
FIG. 2 is a block diagram illustrating a computing system suitable for executing an example embodiment of an Application Usage Identification system.

FIG. 2 is a block diagram of an example server computing system 200 suitable for executing an embodiment of the Application Usage Identification system 240 to identify client application copies used to send communications being analyzed, such as to assist in inhibiting potential fraudulent activity. FIG. 2 further illustrates various user client computing systems 250 and 270 from which users may interact with the server computing system, and other computing systems 290 (e.g., computing systems of various partners and affiliates). In the illustrated embodiment, the server computing system 200 includes a CPU 205, various I/O components 210, storage 230, and memory 220. The I/O components include a display 211, network connection 212, computer-readable media drive 213 and other I/O devices 215 (e.g., a mouse, keyboard, etc.).

An embodiment of the Application Usage Identification system 240 is executing in memory 220, as is an optional Web server system 221 that provides one or more Web sites to users. In particular, users of the client computing systems 270 may interact with the Web server system 221 over the network 280 (e.g., via the Internet and/or the World Wide Web) via client-side browser applications 279 executing in memory 277 of the client computing systems, so as to send legitimate information requests for various electronically accessible resources 231 in storage 230 or other information available via the Web site. In some embodiments, users may further interact with the server computing system 200 in other ways, such as to initiate access to one or more online services available from one or more optional other systems 222 (e.g., a Web store system, an online banking system, a stock trading system, etc.). In this example, the Web server system 221 responds to information requests by providing the requested information to the request senders, and may further generate one or more logs 234 of the requests on storage 230.

In the illustrated embodiment, the Application Usage Identification system 240 operates to automatically assess at least some of the information requests received by the Web server system 221, although in other embodiments the Application Usage Identification system 240 may instead interact with other systems that provide access to electronically accessible resources, such as one or more Web server systems and/or other types of systems that execute on one or more other remote computing systems (e.g., on one or more of the other computing systems 290). The information about the information requests to be analyzed may be obtained in various ways, such as based on interactions between the Application Usage Identification system and the Web server system 221 to obtain information about requests (e.g., before the requests are fulfilled, such as if the analysis is performed in realtime or near-realtime), or instead to analyze some or all requests after they are fulfilled based on retrieval of information about the requests from the logs 234.

The illustrated embodiment of the Application Usage Identification system 240 analyzes information regarding received communications from client computing systems 270, and generates fingerprint identifiers corresponding to the Web browser copies 279 executing on those systems. The information about the received communications that is analyzed may include a combination of various types of header and/or other metadata information sent along with the received communications, and/or additional information supplied by an optional executable client-side information provider component 278 executing in memory 277, such as a component that is executed by or in conjunction with the browser 279. The generated fingerprint identifiers are then stored in database 232 data structure on storage 230 in this example, such as in a manner that is associated with a corresponding user (e.g., a user identified via supplied login information) and/or with any prior communications that match the generated fingerprint identifier. In this example, the users of the client computing systems 270 are legitimate users, and thus few if any of the legitimate received communications from the client computing systems 270 are identified as being potentially related to inappropriate activities.

In addition, in this example, one or more other users are using fraudulent user client computing systems 250 to similarly send communications to the Web server system 221, but with the communications reflecting fraudulent or otherwise inappropriate activities by those users. The Application Usage Identification system 240 similarly analyzes information regarding the received communications from the client computing systems 250 (e.g., header and/or other metadata information included in the received communications, additional information supplied by an optional executable client-side information provider component 258, etc.), and generates fingerprint identifiers corresponding to the Web browser copies 259 executing on those systems. The generated fingerprint identifiers are then stored in database 232 on storage 230 in this example, such as in a manner that is associated with a corresponding user (e.g., a user identified via supplied login information) and/or with any prior communications that match the generated fingerprint identifier. However, if the received communications and/or any associated users are identified as potentially or actually being engaged in inappropriate activities, whether concurrently with the handling of the received communication or instead subsequently (e.g., after fraudulent payment information for a transaction is later discovered to be invalid), the corresponding fingerprint identifiers for those received communications are flagged as being suspect, such as in this example by including those fingerprint identifiers as part of the suspect fingerprint identifiers 236. Thus, when such a user later sends another communication in an attempt to perform another inappropriate activity using the same Web browser application copy, the Application Usage Identification system matches the fingerprint identifier generated for the later communication to the stored suspect fingerprint identifier 236, and identifies the later communication as being suspect. In other situations, a fingerprint identifier may be determined to be suspect in other manners, such as based on receiving a large volume of communications (e.g., of any communications, or of communications of one or more identified types) from the same client application copy, receiving communications from the same client application copy that are identified as being from multiple unrelated users, etc. After a received communication is determined to be suspect based on matching a suspect fingerprint identifier, one or more other components or systems may in this example then determine to deny the received communication or perform special handling of the received communication, such as by the Web server system 221 and/or one or more of the optional other systems 222, although in other embodiments the Application Usage Identification system may perform at least some of such special handling.

It will be appreciated that the illustrated computing systems are merely illustrative and are not intended to limit the scope of the present invention. The server computing systems 200, 250 and 270 may instead each include multiple interacting computing systems or devices, and computing system 200 may be connected to other devices that are not illustrated, including through one or more networks such as the Internet, via the World Wide Web ("Web"), or via private networks (e.g., mobile communication networks, etc). More generally, a server or client computing system or device may comprise any combination of hardware or software that can interact, including (without limitation) desktop or other computers, network devices, PDAs ("Personal Digital Assistants"), cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the Application Usage Identification system may in some embodiments be distributed among various components in various ways, and some of the functionality may instead not be provided as part of the Application Usage Identification system and/or other additional functionality may be available.

It will also be appreciated that, while various items are discussed or illustrated as being stored in memory or on storage while being used, these items or portions of them can be transferred between memory and other storage devices for purposes of memory management and data integrity. Alternatively, in other embodiments some or all of the software systems or components may execute in memory on another device and communicate with the illustrated computing system via inter-computer communication. Some or all of the systems and/or data structures may also be stored (e.g., as software instructions or structured data) on a computer-readable medium, such as a hard disk, memory, a network, or a portable media article (e.g., a DVD or flash memory devices) to be read by an appropriate drive or via an appropriate connection. The systems and data structures may also be transmitted via generated data signals (e.g., by being encoded in a carrier wave or otherwise included as part of an analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present techniques may be practiced with other computer system configurations.

Figure 3A:
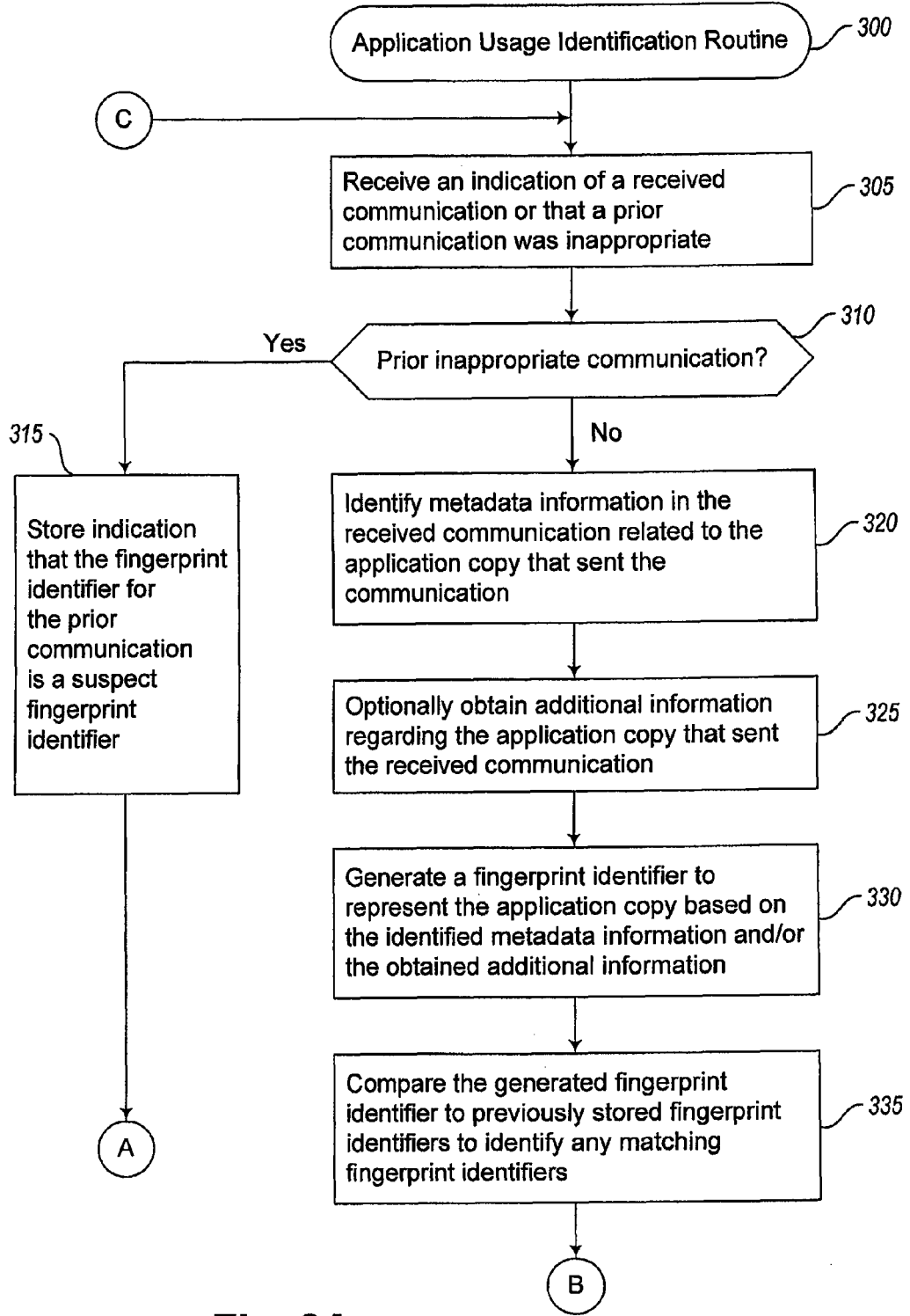
FIGS. 3A and 3B are a flow diagram of an example embodiment of an Application Usage Identification routine.
Figure 3B:
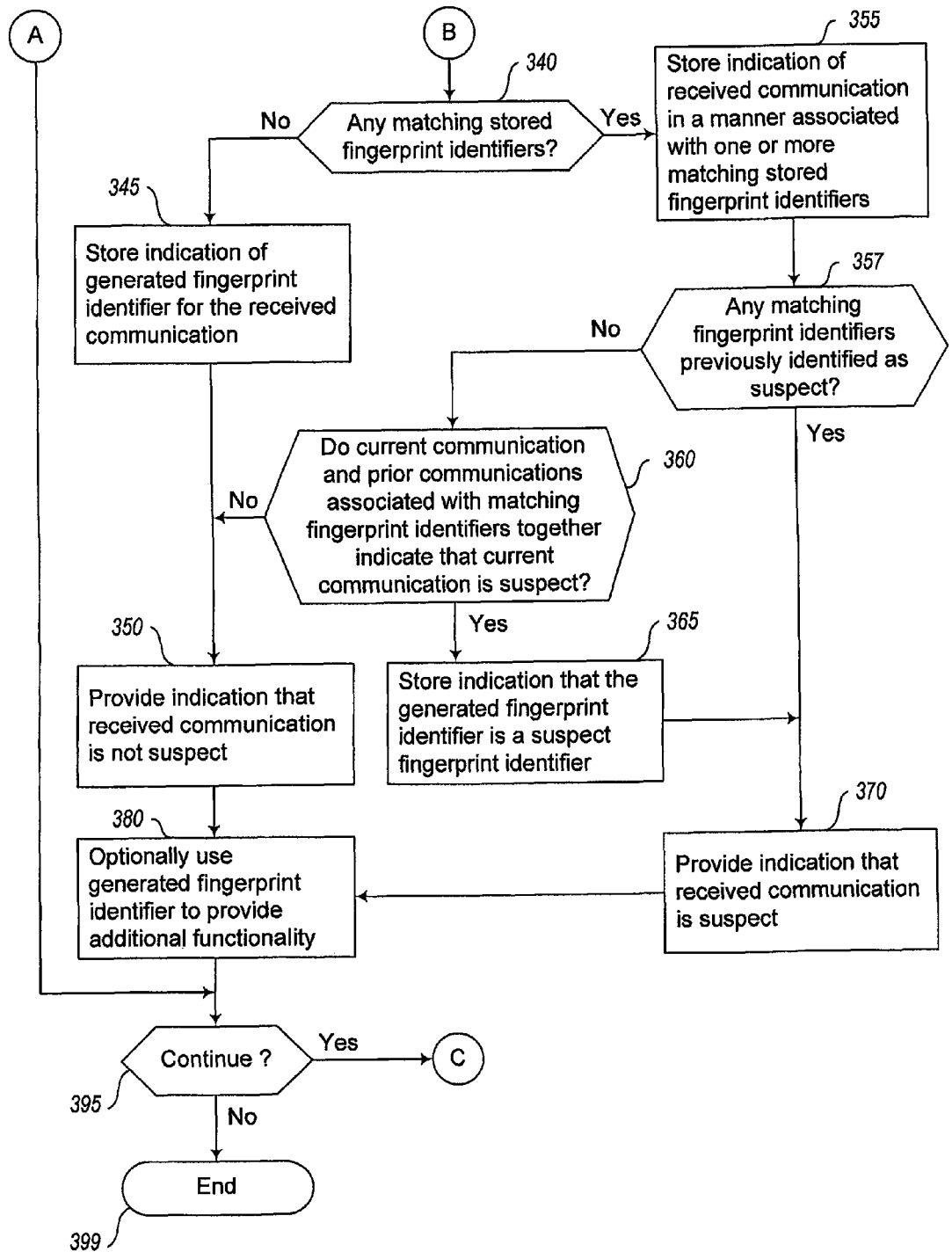

FIGS. 3A and 3B are a flow diagram of an example embodiment of an Application Usage Identification routine 300. The routine may, for example, be provided by execution of the Application Usage Identification system 240 of FIG. 2, such as to identify client application copies used to send communications being analyzed. In this example embodiment, the identification of client application copies is used to facilitate when a received communication is a suspect communication that may reflect inappropriate activities of a user on whose behalf the communication is sent, but in other embodiments the client application copy identification may be used for other purposes (e.g., identifying a particular user who sent a received communication based on a prior association between the user and the particular software application copy used by that user).

The illustrated embodiment of the routine begins at step 305, where an indication is received of a received communication to be analyzed to determine whether the received communication is suspect, or that a prior analyzed received communication has been identified as being inappropriate (e.g., based on inappropriate activities regarding the prior communication having been detected). The indication of a new received communication may be received from, for example, an electronic information service (e.g., from a Web server providing a Web site) that received the communication, such as an electronic information service with which the Application Usage Identification routine functionality is integrated, or one of multiple electronic information services to which the Application Usage Identification routine functionality is provided as a service. If it is determined in step 310 that a prior analyzed received communication is inappropriate, the routine continues to step 315 to store an indication that the stored fingerprint identifier for the prior received communication is a suspect fingerprint identifier, and then continues to step 395.

If it is instead determined in step 310 that a new received communication to be analyzed is received, the routine continues instead to step 320 to begin the analysis. In particular, in step 320 the routine identifies metadata information received with the received communication that is related to the application copy that sent the communication, such as information in a header of the received communication that reflects configuration information for the application copy. In step 325, the routine then optionally obtains additional information regarding the application copy that sent the received communication, such as from executable client-side code that is executing on the client device on which the application copy executes. Such additional information similarly may reflect configuration information for the application copy and/or the client device, or more generally may include any information regarding the client device that may assist in distinguishing an application copy executing on that client device from application copies executing on other devices. In addition, the information may be obtained in various ways, such as by dynamically querying the client-side code, retrieving stored information that was previously provided by the client-side code, delaying the further analysis of the received communication until the additional information is otherwise sent by the client-side code, etc. In addition, while additional information may not be used in some embodiments, in other embodiments the additional information may in at least some situations (e.g., for particular software application copies, for particular types of software applications, etc.) be used instead of communication metadata information rather than in addition to such metadata information.

In the illustrated embodiment, the routine continues after step 325 to step 330 to generate a fingerprint identifier to represent the application copy that sent the received communication based on a combination of the identified metadata information and any obtained additional information. In step 335, the routine then compares the generated fingerprint identifier to stored fingerprint identifiers for previously received communications to determine if the generated fingerprint identifier matches one or more stored fingerprint identifiers, such as by being identical or in other embodiments by being sufficiently similar (e.g., to have a degree of match that exceeds a predefined similarity threshold).

After step 335, the routine continues to step 340 to determine if the generated fingerprint identifier matched any stored fingerprint identifiers, and if not continues to step 345 to store an indication of the generated fingerprint identifier for the received communication. If so, the routine continues to step 355 to store an indication of the received communication in a manner associated with one or more of the matching stored fingerprint identifiers, such as each matching stored fingerprint identifier or the stored fingerprint identifier that best matches the generated fingerprint identifier. Alternatively, in some embodiments, if none of the matching stored fingerprint identifiers are an identical match, the generated fingerprint identifier may instead be stored as a new fingerprint identifier in a manner associated with the received communication. After step 355, the routine continues to step 357 to determine if any of the matching fingerprint identifiers were previously identified as being suspect, and if so the routine continues to step 370 to provide an indication that the received communication is suspect.

If none of the matching fingerprint identifiers were previously identified as being suspect, the routine continues instead to step 360 to determine if a combination of the received communication and prior communications associated with the matching fingerprint identifiers together reflect that the received communication may be suspect. As previously noted, a combination of communications from a single application copy may indicate that one or more of the communications are suspect in various ways, such as based on a volume of communications (or a volume of communications of a particular type), based on multiple communications that are indicated as corresponding to multiple distinct users, etc. If the combination of the received communication and prior communications does reflect that the received communication may be suspect, the routine continues to step 365 to store an indication that the generated fingerprint identifier and matching fingerprint identifiers are suspect fingerprint identifiers, and then continues to step 370.

If it is instead determined in step 360 that the combination of the received communication and prior communications does not reflect that the received communication may be suspect, or after step 345, the routine continues to step 350 to provide an indication that the received communication is not suspect. After steps 350 or 370, the routine then continues to step 380 to optionally perform one or more additional operations, such as to use the generated fingerprint identifier to provide additional functionality. For example, as previously noted, an identification of a user associated with the generated fingerprint identifier may be made, such as based on an association of the user to a single stored fingerprint identifier that is identified as matching the generated fingerprint identifier in step 335. After step 380, the routine continues to step 395 to determine whether to continue. If so, the routine returns to step 305, and if not ends at step 399.

In some embodiments, the routine may operate in conjunction with one or more other systems, such as a system that receives communications and provides them to the routine to be analyzed, a system that distributes client-side executables to client devices so that additional information about client application copies and the client devices may be obtained, a system that receives additional information about client application copies and client devices from client-side executables and that provides the received information to the routine, a system that performs further handling of received communications to determine if they are inappropriate and that provides indications to the routine of such inappropriate communications, etc.

In addition, as previously noted, received communications may be identified as being suspect in various ways, including based at least in part on the software application copies that send the received communications. In some embodiments, the identification of suspect received communications is further performed in additional manners, such as in combination with the identification of particular software application copies. For example, other techniques for identifying suspect received communications that may be used in combination with the described software application copy identification techniques include techniques based on the content of the received communications, on the content of metadata information included with the received communications, on additional information about a user on whose behalf a received communication is sent, etc. For example, one or more assessment tests may be applied to a received message or other communication that each test distinct aspects of the received communication, with the results of the various assessment tests being combined in various manners to generate an ultimate determination of whether the received communication is suspect (or has one or more other attributes of interest). In such embodiments, the use of the described software application copy identification techniques may be part of one or more assessment tests that are combined with other assessment tests. Additional details related to assessment tests and techniques for identifying suspect communications are included in co-pending U.S. application Ser. No. 11/539,076, filed Oct. 5, 2006 and entitled "Detecting Fraudulent Activity By Analysis Of Information Requests," which is incorporated herein by reference in its entirety.

Those skilled in the art will also appreciate that in some embodiments the functionality provided by the routine discussed above may be provided in alternative ways, such as being split among more routines or consolidated into fewer routines. Similarly, in some embodiments the illustrated routine may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising:
    receiving, by one or more configured computing devices, a communication from an executing copy of a software application;
    obtaining, by the one or more configured computing devices, information specific to the executing copy of the software application;
    generating, by the one or more configured computing devices, an identifier to represent the executing copy of the software application based at least in part on the obtained information;
    determining, by the one or more configured computing devices, whether the generated identifier corresponds to any stored identifiers for any software application copies that were previously identified as suspect; and
    if the generated identifier is determined to correspond to any stored identifier for a software application copy that was previously identified as suspect, providing, by the one or more configured computing devices, an indication that the received communication is suspect, and otherwise not providing the indication that the received communication is suspect.

2. The method of claim 1 wherein the obtained information includes a value for each of at least one parameter related to operation of the executing copy of the software application.

3. The method of claim 1 wherein the received communication is a request for a Web page available from a Web site on behalf of a user, the executing copy of the software application is a copy of a Web browser executing on a client device of the user, and the obtained information includes information obtained from metadata associated with the received communication.

4. The method of claim 3 wherein the generating of the identifier is further based in part on additional information regarding the Web browser copy and regarding the client device that is received from client-side code executing on the client device.

5. The method of claim 4 wherein the additional information includes a time zone of the client device, a screen resolution of the client device, and indications of versions of one or more programs installed on the client device.

6. The method of claim 1 wherein the obtained information includes HTTP header information including values for each of multiple HTTP header fields, the multiple HTTP header fields including at least one of a User-Agent field, an Accept-Charset field, an Accept-Encoding field, and an Accept-Language field.

7. The method of claim 1 wherein the providing of the indication that the received communication is suspect includes at least one of denying a user access to the information available from an electronic information service and performing additional analysis regarding the received communication before providing the user access to the information available from the electronic information service.

8. The method of claim 1, further comprising, if the received communication is determined to be suspect, storing an indication of the generated identifier as one of the stored identifiers for software application copies that were previously identified as suspect.

9. The method of claim 1 wherein the obtained information includes multiple parameter values related to operation of the executing copy of the software application and the generating of the identifier is based at least in part on a combination of the multiple parameter values.

10. The method of claim 9 wherein the generating of the identifier based at least in part on the combination of the multiple parameter values includes supplying the combination of the multiple parameter values as input to a one-way hash function, the generated identifier including an output of the one-way hash function.

11. The method of claim 1 further comprising, determining that the generated identifier corresponds to a stored identifier for a first software application copy that previously sent one or more communications, determining whether a combination of communications that include the received communication and the previously sent one or more communications is likely to reflect inappropriate activities of a user of the first software application copy, and providing an indication that the received communication is suspected of being inappropriate if it is determined that the combination of the communications is likely to reflect inappropriate activities.

12. The method of claim 1 further comprising, storing an indication of the generated identifier in a manner associated with the received communication for later use in determining whether a new received communication from the software application copy that sent the received communication is suspected of being inappropriate.

13. A non-transitory computer-readable medium having stored contents that configure a computing device to:
receive a communication from an executing copy of a software application;
obtain information specific to the executing copy of the software application;
generate an identifier to represent the executing copy of the software application based at least in part on the obtained information;
determine whether the generated identifier corresponds to any stored identifiers for any software application copies previously identified as suspect; and
if the generated identifier is determined to correspond to a stored identifier for any suspect software application copy, provide an indication that the received communication is suspect.

14. The non-transitory computer-readable medium of claim 13 wherein the received communication is a request for information and/or functionality provided by an electronic information service, wherein the obtained information specific to the executing copy of the software application includes values for one or more parameters related to configuration of the software application copy that are obtained as part of receiving the received communication, and wherein the software application copies previously identified as suspect each previously sent one or more communications that reflect attempted inappropriate interactions by a user with the electronic information service.

15. The non-transitory computer-readable medium of claim 13 wherein the stored contents configure the computing device to:
determine whether the generated identifier corresponds to a stored identifier for a first software application copy that previously sent one or more communications;
if it is determined that the generated identifier corresponds to a stored identifier for the first software application copy, determine whether a combination of communications that include the received communication and the previously sent one or more communications is likely to reflect inappropriate activities of a user of the first software application copy; and
provide an indication that the received communication is suspect if it is determined that the combination of the communications is likely to reflect inappropriate activities of the user.

16. The non-transitory computer-readable medium of claim 13 wherein the stored contents configure the computing device to store an indication of the generated identifier in a manner associated with the received communication for later use in determining whether a new received communication from the software application copy that sent the received communication is suspected of being inappropriate.

17. A configured computing device, comprising:
a processor; and
one or more components configured to, when executed by the processor, determine whether a communication received from an executing copy of a software application is suspect by:
obtaining information specific to the executing copy of the software application;
generating an identifier to represent the executing copy of the software application based at least in part on the obtained information;
determining whether the generated identifier corresponds to any stored identifiers for any software application copies previously identified as suspect; and
if the generated identifier is determined to correspond to a stored identifier for any suspect software application copy, providing an indication that the received communication is suspect.

18. The configured computing device of claim 17 wherein the received communication is a request for information and/or functionality provided by an electronic information service, wherein the obtained information specific to the executing copy of the software application includes values for one or more parameters related to configuration of the software application copy that are obtained as part of receiving the received communication, and wherein the software application copies previously identified as suspect each previously sent one or more communications that reflect attempted inappropriate interactions by a user with the electronic information service.

19. The configured computing device of claim 17 wherein the one or more components, when executed by the processor, are configured to:
determine whether the generated identifier corresponds to a stored identifier for a first software application copy that previously sent one or more communications;
if it is determined that the generated identifier corresponds to a stored identifier for the first software application copy, determine whether a combination of communications that include the received communication and the previously sent one or more communications is likely to reflect inappropriate activities of a user of the first software application copy; and provide an indication that the received communication is suspect if it is determined that the combination of the communications is likely to reflect inappropriate activities of the user.

20. The configured computing device of claim 17 wherein the one or more components, when executed by the processor, are configured to store an indication of the generated identifier in a manner associated with the received communication for later use in determining whether a new received communication from the software application copy that sent the received communication is suspected of being inappropriate.

\* \* \* \* \*